(12) United States Patent
Tepic (10) Patent No.: US 9,049,752 B2
(45) Date of Patent: Jun. 2, 2015

(54) GENERATING ELECTRICAL POWER UTILIZING SURFACE-LEVEL HOT AIR AS THE HEAT SOURCE, HIGH ATMOSPHERE AS THE HEAT SINK AND A MICROWAVE BEAM TO INITIATE AND CONTROL AIR UPDRAFT

(71) Applicant: Slobodan Tepic, Zurich (CH)

(72) Inventor: Slobodan Tepic, Zurich (CH)

(73) Assignee: Aella SA, Zurich (CH)

( * ) Notice: Subject to any disclaimer, the term of this patent is extended or adjusted under 35 U.S.C. 154(b) by 0 days.

(21) Appl. No.: 13/865,556

(22) Filed: Apr. 18, 2013

(65) Prior Publication Data

US 2013/0229015 A1 Sep. 5, 2013

Related U.S. Application Data

(63) Continuation of application No. 12/839,409, filed on Jul. 20, 2010, now abandoned.

(60) Provisional application No. 61/226,760, filed on Jul. 20, 2009.

(51) Int. Cl.
| | |
|---|---|
| F03B 13/00 | (2006.01) |
| H02P 9/04 | (2006.01) |
| H05B 6/64 | (2006.01) |
| F03D 1/04 | (2006.01) |
| F03D 9/00 | (2006.01) |

(52) U.S. Cl.
CPC ............... *H05B 6/6426* (2013.01); *F03D 1/04* (2013.01); *F03D 9/00* (2013.01); *F05B 2240/131* (2013.01); *F05B 2260/24* (2013.01); *Y02E 10/465* (2013.01); *F03D 9/002* (2013.01); *F03D 9/007* (2013.01); *F05B 2220/60* (2013.01); *F05B 2240/93* (2013.01); *Y02E 10/72* (2013.01)

(58) Field of Classification Search
CPC ........... H05B 6/6426; H05B 2240/131; H05B 2220/60; H05B 2260/24; H05B 2240/93; H05B 6/64; F03D 9/002; F03D 1/04; F03D 9/00; F03D 9/007; Y02E 10/465; Y02E 10/725; Y02E 10/72; F03G 6/045
USPC ........................... 290/54, 2, 1 R, 43; 219/687
See application file for complete search history.

(56) References Cited

U.S. PATENT DOCUMENTS

| | | | | |
|---|---|---|---|---|
| 3,936,652 A | * | 2/1976 | Levine | ............... 290/2 |
| 4,397,793 A | * | 8/1983 | Stillman et al. | ................. 261/30 |
| 4,499,034 A | * | 2/1985 | McAllister, Jr. | .............. 261/109 |

(Continued)

*Primary Examiner* — Javaid Nasri
(74) *Attorney, Agent, or Firm* — Occhiuti & Rohlicek LLP (57) ABSTRACT

The invention describes a method of generating electrical power utilizing hot surface air as the heat source, high atmosphere as the heat sink and a microwave beam aimed upward providing updraft to initiate and control the large-scale air circulation. The frequency of the microwave beam is centered at approximately 60 GHz, within the absorption band of molecular oxygen, so as to result in beam penetration to an altitude of several kilometers. The power plant comprises a high-power microwave source, e.g. a bank of gyrotrons, one or more turbine-generator sets, and—optionally—a condenser/cyclone (if on a floating platform). The plant can also provide clean water from condensation out of humid, sea level air. The plant could also be used to remove atmospheric carbon dioxide from large quantities of air. The dynamic chimney produced by the microwave beam could alternatively be deployed in conjunction with a solar heat power plants, industrial chimneys, and cooling towers of conventional power plants to increase their effective height.

15 Claims, 8 Drawing Sheets

(56) References Cited

U.S. PATENT DOCUMENTS

| | | | |
|---|---|---|---|
| 4,643,866 A * | 2/1987 | Thornton et al. | 376/245 |
| 5,387,781 A * | 2/1995 | Berkoff | 219/735 |
| 5,483,798 A * | 1/1996 | Prueitt | 60/675 |
| 6,772,593 B2 * | 8/2004 | Dunn | 60/641.11 |
| 6,830,597 B1 * | 12/2004 | Green | 48/209 |
| 7,086,823 B2 * | 8/2006 | Michaud | 415/4.2 |
| 7,331,303 B2 * | 2/2008 | Park | 114/264 |
| 7,757,490 B2 * | 7/2010 | Kenessey | 60/641.12 |
| 2005/0150225 A1 * | 7/2005 | Gwiazda et al. | 60/641.1 |

* cited by examiner

GENERATING ELECTRICAL POWER UTILIZING SURFACE-LEVEL HOT AIR AS THE HEAT SOURCE, HIGH ATMOSPHERE AS THE HEAT SINK AND A MICROWAVE BEAM TO INITIATE AND CONTROL AIR UPDRAFT

CROSS-REFERENCE TO RELATED APPLICATIONS

The present application is a continuation of U.S. patent application Ser. No. 12/839,409, which was filed on Jul. 20, 2010, and which claims the benefit of the filing date of U.S. Provisional Application No. 61/226,760, which was filed on Jul. 20, 2009. The content of the priority applications are hereby incorporated by reference herein in their entirety.

BACKGROUND

1. Field of the Invention

The invention relates to a method of generating clean electrical power from atmospheric convective cells anchored and controlled by a high-power microwave beam within the absorption band of oxygen.

2. Discussion of Related Art

Global warming due to human activities releasing ever larger quantities of carbon dioxide—a major greenhouse gas—into the atmosphere has become a main concern for the future development of civilization. One important step in solving this immense problem is decarbonization of electrical power grids—worldwide. Everything possible that can help should be done, but the highly predictable environmental catastrophe will not be avoided unless thousands—tens of thousands—of gigawatt-level, zero-emission electrical power stations are put into use by mid century.

Currently, there are about 4 terawatts (TW) of installed capacity to produce electrical power worldwide—almost all of it relies on non-renewable sources, including nuclear. In the USA, the installed capacity is about 1 TW. On average, 50% of capacity is actually used due to unavoidable fluctuation in demand. In 2005, 49.7% of the production was from coal; 19.3% from nuclear; 18.7% from natural gas; 6.5% from hydro; 3% from oil; 1.6% from biomass; the balance of 1.2% from geothermal, solar and wind. Thus only 9.3%—most of it from hydro—was renewable and over 71.4% resulted in carbon dioxide release.

Notwithstanding the rapid increase of wind and solar electricity production, there has been no overall increase in relative use of renewables during the last few years—in absolute terms, use of coal and gas has grown even faster. Worldwide total energy need is about 15 TW and it may expand to 50 or even 100 TW by the end of the century. As oil supplies peak and then decline, electrical energy will be expected to replace most of it. Of the current technologies not resulting in carbon dioxide release, only nuclear power could be scaled up to meet this demand quickly enough, but for many reasons this will not happen. Furthermore, supplies of uranium are also exhaustible.

Even if nuclear fusion makes a breakthrough, it will not eliminate some of the major concerns with nuclear power generation. Sequestration of carbon dioxide, while technologically feasible, fails to satisfy the fundamental need to turn to renewable sources.

The present invention provides a renewable source for electricity generation utilizing a solar chimney created by a microwave beam to form an artificial tornado.

In the prior art relating to the vortex as an "artificial tornado" (Michaud L M U.S. Pat. No. 7,086,823; Michaud L M, Vortex process for capturing mechanical energy during upward heat-convection in the atmosphere, Applied Energy, 62, (1999): 241-251) it has been assumed that once established the vortex would remain stable based only on what one could consider boundary conditions at ground level. While a tornado provides a useful illustration and has motivated this inventor, as well as others referenced herein, use of the vortex as a stable conduit to higher atmosphere requires mechanisms beyond any offered by prior art proposals.

A natural tornado is a fleeting phenomenon arising from a confluence of factors in a much larger storm system. Energy must be expanded to maintain the vortex and it must be used deliberately to replace the conditions, which in the natural tornado are produced by the storm system surrounding the tornado vortex itself. However, the tornado, and in particular the dreaded suction vortex, do teach the physical possibility of a "dynamic chimney".

Computer simulations of the tornado, which can replicate the naturally occurring wind patterns, use a "forcing function" to model the vertical updraft in the center of the tornado (Nolan D S, Almgren A S, Bell J B, Studies of the relationship between environmental forcing and the structure and dynamics of tornado-like vortices, Lawrence Berkeley National Laboratory Report LBNL-47554, September 2000), which, in nature, is the result of a thermal anomaly, i.e. the presence of air warmer at an altitude of several kilometers above the ground than at ground level. There would be no tornado without the forcing function—and if the forcing function were placed at ground level, the vortex would not reach to higher altitudes. In fact, the vortex of a natural tornado is established at higher altitudes and it only touches the ground as it stretches downwards along its axis of rotation.

The conventional solar chimney concept has been well tested and there are plans now to build large power plants at 100's MW level (Schlaich J, Bergermann R, Schiel W, Weinrebe G, Design of Commercial Solar Updraft Tower Systems—Utilization of Solar Induced Convective Flows for Power Generation, J. of Solar Energy Engineering, 127 (1), (2005): 117-124). The power of a solar chimney plant is approximately proportional to the volume defined by the height of the chimney and the greenhouse roof at the ground. Recent plans for a large plant in Australia call for a 1000 m tall chimney and a 7 km-diameter glass roof for a 200 MW plant. A "dynamic chimney," created by the microwave beam according to this invention, could reach to 5000 m or higher and thus increase the power of such a plant five-fold to the gigawatt range, with all of the plant structure remaining near the ground level.

U.S. Pat. No. 3,936,652, by Steven K. Levine, discloses a power system based on updraft generated by a cooling tower of an existing power plant, e.g. a nuclear power plant.

U.S. Pat. No. 4,397,793, by Gerald I. Stillman and Rudolf A. Wiley, discloses a method of increasing the efficiency of a cooling tower or a stack, by introducing a vortex via vertical slits in the wall of the tower or stack.

U.S. Pat. No. 4,499,034, by John E. McAllister, Jr., discloses a cooling tower supplemented by a vortex which increases the efficiency and thus allows for power extraction via windmills placed into the inlet passages.

U.S. Pat. No. 5,483,798, by Melvin L. Prueitt, discloses convection towers wherein the airflow is driven by cooling the air via water sprays.

U.S. Pat. No. 6,772,593, by Michael A. Dunn, discloses a vortex driven power station, whereby the air is warmed up under solar collectors—a concept similar to the solar chimney, already referenced above.

SUMMARY OF THE INVENTION

This invention provides a solution for extracting work for production of electricity by a heat engine powered by the solar heat deposited to the surface of the oceans or lands, preferably at subtropical/tropical latitudes. Distribution of pressure and temperature with altitude up to the tropopause clearly points to a large potential for extracting work from atmospheric air if only certain of the natural convective cells are stabilized and anchored onto points of power extraction, which relies on known principles of operation of turbomachines.

In short, hot humid air is drawn through the power plant by underpressure created by buoyancy of the air column above the plant that is heated by a high-power microwave beam emanating from the plant itself. The microwave generator may be powered by a fraction of the electrical energy produced by the plant. The frequency of the microwave generator may be approximately 60 GHz, within an absorption band of the molecular oxygen, adjusted to allow for effective heating to an altitude of several thousand meters. A gyrotron is a well developed, commercially available microwave source which can be used to create the microwave beam. Multiple units of MW level continuous-wave (CW) gyrotrons can be deployed to meet the power demand of such a beam.

According to another aspect of the invention, a Coriolis effect imparts circulation on the incoming moist air. Inlet vanes can guide the air to aid in creating the Coriolis effect. The incoming air enters the power plant at its low end and gains speed as it passes through the inlet vanes. Turbines power the electrical generators—some of the electrical energy produced is used to power the microwave beam generator. The microwave generator is powered from the grid to start up the plant until the cell circulation is established and stabilized. After the turbines, the air preferably passes through a constriction wherein the pressure drop, due to increased speed, results in condensation that is nucleated by injection of water mist. This stage is followed by a cyclone, which separates thence-condensed water from the general airflow. Latent heat of vaporization released by condensation is transferred to the air mass, adding to the updraft. Dried, warmer air exits the plant in a vortex centered on the microwave beam.

This heat engine would theoretically operate between the sea surface temperature of approximately 300 K and the troposphere temperature of about 250 K from which most of radiative cooling of the Earth into space is effected. The maximum theoretical efficiency would thus be $\eta=(1-250/300)*100=17\%$. Most modern heat engines operate at about half of their theoretical limits, which, with typically high source temperatures, approach 80%. Overall efficiencies are thus still below 50%. If the power plant of this invention reaches 1% efficiency, i.e. 6% of the theoretical limit, operating over an area of 10 km in radius it could generate a gigawatt of electrical power. Economy of large machines is of the utmost interest. Generators of this power are common, but such powerful turbines running at low pressures/low temperatures have not been built as yet. Use of high strength composites should allow for construction of very large machines running at relatively high speeds. Alternatively, multiple smaller turbine/generator units could be combined into a single plant, e.g. 32 or 16 units rated at 35 to 70 MW each.

Whether some of the atmospheric convection cell sizes are more stable than others, appearing to represent a sort of "eigenvalues" is to be learned from theory and observation, but detailed studies of hurricanes have shown existence of mesovortices within these largest of the storms, which are of the approximate scale conceived to be a basic unit of convection for the power plant of this invention, i.e. 10 km in radius and 10 km in height.

Convection cells in the Earth's atmosphere span the sizes from molecular separation distances to thousands of kilometers characteristic of the global convective cells known as Hadley, polar and Ferrel cells. Naturally extracted work from the solar heat deposited into the atmosphere is only that of winds and ocean currents—all of it amounting to about 2%.

Extracting 1% of work from the heat available at most favorable locations—a half of what natural processes of convection yield on average—appears a realistic goal. Several tens of thousands of GW scale power plants anchored along the coasts of the warm oceans—not far from where most of the current and future users are—could ultimately provide all of the power civilization may need—at zero emissions and at low operational and maintenance costs. The platforms and the superstructure would preferably be built by modern technologies of high strength concrete construction. Steel construction, such as used in shipbuilding, may offer an alternative to concrete, the ultimate choice to be made based on total costs and environmental impact during the expected lifetime. Anchoring rows of such power plants along the coasts most threatened by large weather storms (called hurricanes in the Atlantic, typhoons in the Pacific and tropical cyclones in the Indian Ocean) would also produce barriers these storms could not cross because sea surface air would be colder and less humid (Alamaro M, Michele J, Pudov V, A preliminary assessment of inducing anthropogenic tropical cyclones using compressible free jets and the potential for hurricane mitigation, J. of Weather Modification, 38, (2006): 82-96).

The world is running hotter, but also, just as dangerously, short on water. One of the mechanisms of heat transfer involved in the power plant of this invention, if placed on water, is release of the latent heat of evaporation by condensation of water from the inflowing humid air, just as it happens in hurricanes. The condensed water is collected inside the power plant and is pumped to the land.

Just as "rainfall" occurs within these anchored machines, so does a large amount of air pass through them. If all of the world's electricity production were done this way, all of the Earth's atmosphere would pass through these machines in about 5 years. Even the current levels of $CO_2$ are of a major concern—active removal is conceivable, but air needs to be accessible for that to work. If 1% of $CO_2$ could be removed in a single pass, reducing $CO_2$ concentration by 10% would become feasible in 50 to 100 years.

Alternatively, such power plants could also be built on dry land, preferably in the arid hot deserts. Lack of humidity and ocean heat capacity would result in lower efficiency and stronger variation between day and night operation, but the construction would be simpler and the costs probably lower.

DETAILED DESCRIPTION

An electrical power plant according to this invention is to operate preferably on a platform floating at sea, utilizing hot humid air as the heat source and the high atmosphere as the heat sink. Anchored along the continental coasts of the tropical/subtropical oceans, where average absorbed solar insolation is in the range of 200 to 300 $W/m_2$ and sea surface temperatures are on the order of 300 K, such plants could be built to continuously operate at a gigawatt (GW) level. Air circulation around the center of the plant resembles a natural cyclone; vertical outflow is induced by buoyancy of the air column above the plant heated by a microwave beam aimed from the plant upward. The frequency of the microwave beam is centered at approximately 60 GHz, within an absorption band of molecular oxygen. The preferred source of the microwave beam is a gyrotron.

In addition to clean electrical power, the plant can also provide clean water from condensation out of the humid, sea level air. Anchoring rows of such power plants along the coasts most threatened by large weather storms (called hurricanes in the Atlantic, typhoons in the Pacific and tropical cyclones in the Indian Ocean) would also produce barriers these storms could not cross because sea surface air would be colder and less humid.

Furthermore, large quantities of air would be moved through such plants offering a possibility to actively remove atmospheric carbon dioxide.

Alternatively, such power plants can also be built on dry, hot, uninhabitable lands. In another option, air inflow could be facilitated by a greenhouse enclosure, such as proposed for the solar chimney plant, but with the physical structure of the chimney being replaced by the microwave generated updraft, which can reach to the tropopause and hence increase the maximum power generating capacity, while avoiding the considerable cost of chimney construction.

Furthermore, conventional chimneys, particularly of industrial type, could be supplemented or replaced by microwave beam-driven air updraft.

In the current invention the updraft is generated by a microwave beam, aimed upwards from the center of the plant, the frequency of the microwaves chosen so as to effectively heat the air column that the beam passes through. As the air moves from the lower altitudes up, it travels through the beam, and continues to absorb energy on its way up. The ideal choice for the frequency is around 60 GHz, within the absorption band of molecular oxygen. Traveling through the atmospheric pressure air, microwaves of this frequency are absorbed with about 10 dB/km, i.e. traveling through 1 km of air the beam would deposit 90% of its energy. With lower density at higher altitudes, the absorption is reduced and hence the beam will penetrate higher. Below and above the peak, the absorption is lower, hence the penetration is higher (detailed data is presented in: Tretyakov M Yu, Koshhelev M A, Dorovskikh V V, Makarov D S, Rosenkranz P W, 60-GHz oxygen band: precise broadening and central frequencies of fine-structure lines, absolute absorption profile at atmospheric pressure, and revision of mixing coefficients, J. of Molecular Spectroscopy, 231, (2005): 1-14). The peak of the absorption spectrum also changes with the pressure and temperature of the air—a complication, but also an opportunity to optimize the beam penetration. Ultimately, the vertical speed of the heated air and incidental winds need to be taken into consideration when optimizing the beam—tilting the beam downwind could partially compensate for the effects of incidental winds. The microwave beam thus generates a conduit to higher atmosphere, a dynamic chimney, its efficacy and stability enhanced by the vortex which pushes the colder, denser air outwards.

High-power microwave generators have seen a rapid progress in efficiency and power in the last decade, much of the development motivated by the needs of the ITER project (International Thermonuclear Experimental Reactor, a tokamak-based fusion reactor), but also by the expanding industrial uses of millimeter-wavelength microwaves. Gyrotrons operating in continuous wave mode at 2 MW power at from 30 to well above 100 GHz are within reach—those at near 1 MW are commercially available. Efficiencies have surpassed 50% (G. G. Denisov, V. E. Zapevalov, A. G. Litvak, and V. E. Myasnikov, Megawatt Gyrotrons for ECR Heating and Current-Drive Systems in Controlled-Fusion Facilities, Radiophysics and Quantum Electronics, Vol. 46, No. 10, 2003). A parabolic antenna, covered by a dome, would collimate the beam and send it upwards. Should off-axis steering of the beam be required to compensate for winds, preferably it could be done by mechanically inclining the antenna—electronic steering would call for phase control of the gyrotrons—a costly proposition (J. T. Kare and K. L. G. Parkin, A Comparison of Laser and Microwave Approacahes to CW Beamed Energy Launch, Beamed Energy Propulsion: Fourth International Symposium, American Institute of Physics, 2006).

The turbines extract kinetic energy from the air flow entering the plant radially through the inlets at ground level and exiting axially from the outlet on the top of the plant. The outlet is connected to the higher atmosphere by the microwave guided dynamic conduit. The main inlet vanes, which also support the whole structure erected on the floating platform, guide the inflowing air to the center of the machine. The flow of air into the power plant resembles a natural cyclone, a micro hurricane of a sort. Hurricanes are rather stable natural phenomena, driven by sun's thermal energy. They do require special conditions in that the energy conversion cycle comprises evaporation and condensation of water that only occurs within a narrow range of sea surface temperatures. In contrast to natural hurricanes, which move over the ocean masses, cooling the surface water in their wake, a fraction of the power available is used by these power plants to anchor the circulation cell by deliberately creating a fixed conduit to the higher atmosphere, generating the updraft by a microwave beam appropriately tuned within the absorption band of molecular oxygen. Enthalpy released by the condensation of the humid air increases efficacy of the herein-proposed high-power microwave beam generated updraft. Condensation is achieved by a pressure drop due to an increase in velocity and by nucleation over water mist injected into the humid air. Condensed water is separated from the air in a cyclone stage prior to air exiting the plant in a vertical vortex.

Figure 1:
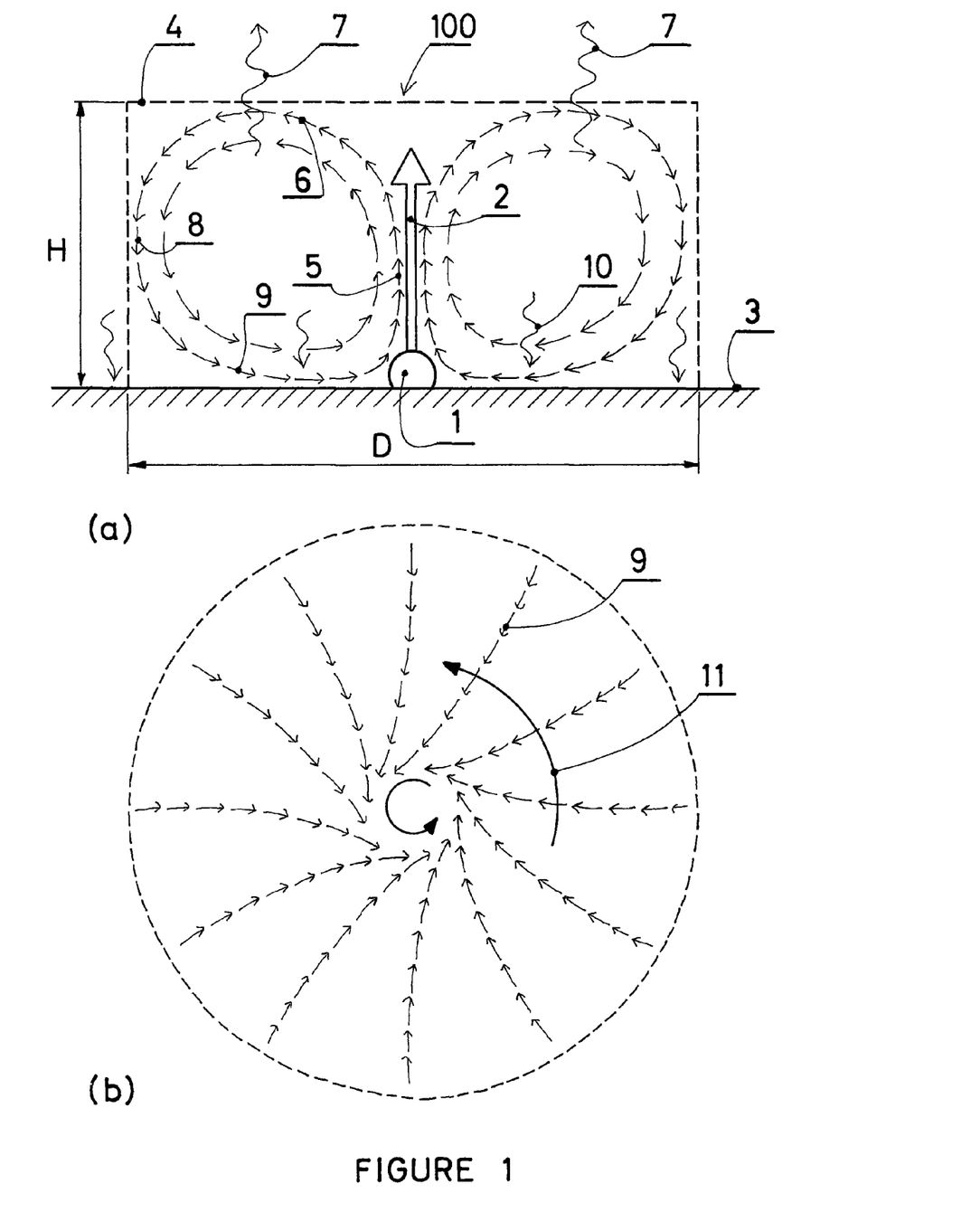
FIG. 1 illustrates a convective atmospheric cell centered on a microwave beam.

FIG. 1a shows a vertical cross-section of a convective cell 100 of air above the ground 3, over a circular area of diameter D, with the effective height of the atmospheric column H. The cell is centered over a microwave source 1, which generates a microwave beam 2 aimed upwards towards the top 4 of the convective cell. The updraft 5 in the center of the cell is driven by buoyancy of the hot ground air additionally heated by the beam 2. In the upper layers of the atmosphere the radial outflow 6 is cooled by radiation 7 into space. The cooled air is then moving down, 8, along the outer boundary of the cell. Solar heat 10 deposited to the ground level air, directly and indirectly, via ground interaction, warms the centripetal flow of air 9. Viewed from above, FIG. 1b, the air inflow 9 along the ground may attain more or less circulation 11, caused by the Coriolis effect, depending on the geographical position. First estimates of the basic convection cell size are 20 km for the diameter D and 10 km for the height H.

Figure 2:
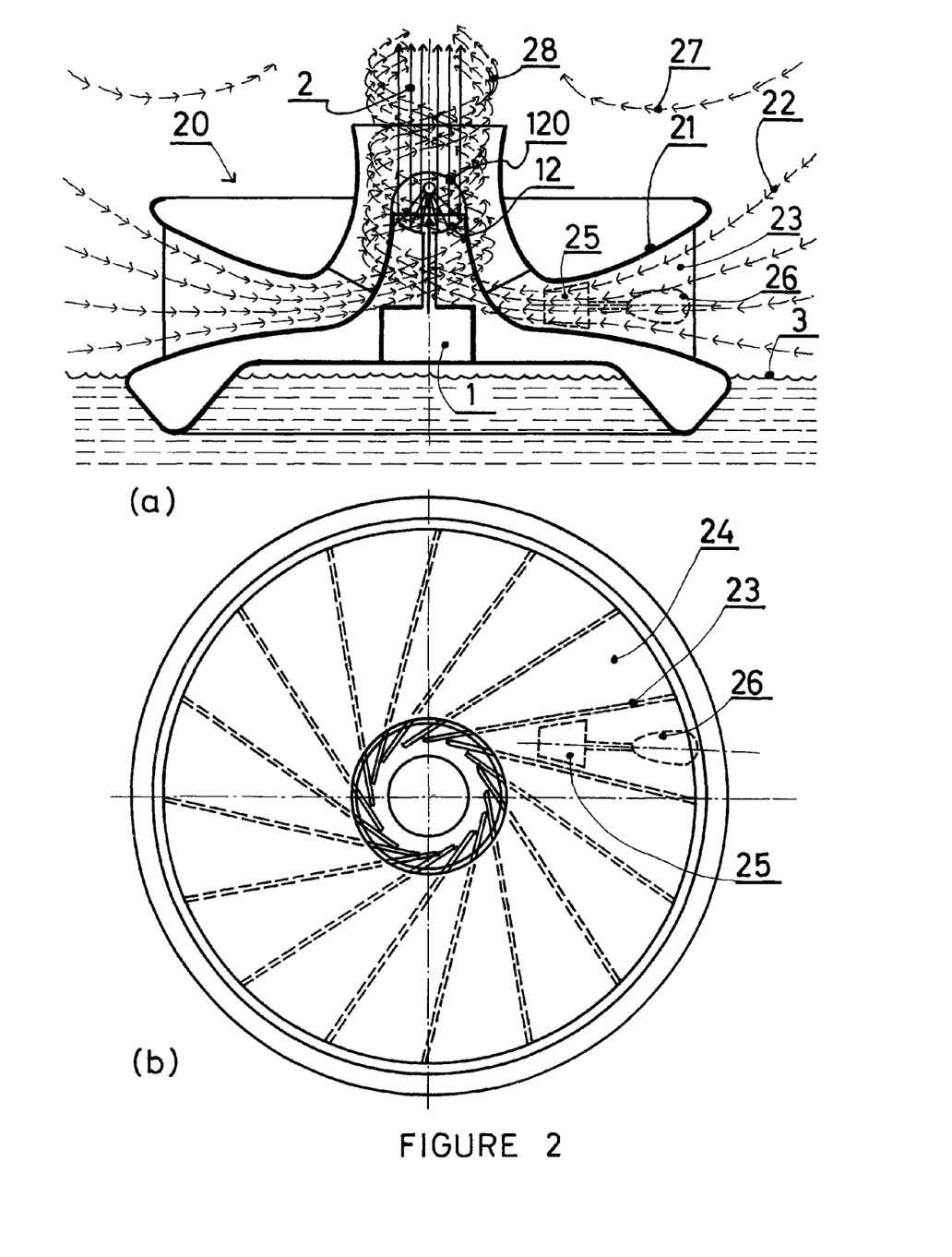
FIG. 2 is schematic representation of a power plant using a microwave beam to establish a convective atmospheric cell and collecting some of the air flow around its center and near the ground level to convert some of its kinetic energy into electricity.

FIG. 2a shows a vertical cross-section of the basic layout of the power plant, 20, designed to capture some of the air circulation at the very center of the convective cell and extract some of its energy. The microwave beam 2 emanates from an antenna 12, protected by the dome 120, with the microwave source 1, being placed at the ground level 3. The roof 21 of the plant structure is shaped to effectively guide the airflow 22 into the plant. Much of the air circulating within the convective cell will inevitably bypass the plant, as shown by arrows 27. However, the first estimates suggest that within physical and economical limitations of current construction technologies, the plant can be built large enough to meet the expected target of a gigawatt net power. A top view of the plant, FIG. 2b, indicates the tangential placement of the large vanes 23, which divide the volume of the plant into equal segments 24, and support the roof 21. In one of the embodiments of the invention, each of the segments 24 houses a turbine, 25, and a generator, 26, set. Tangential arrangement of the vanes 23 imparts an angular momentum to the air outflow 28 from the top of the plant over the microwave beam 2, adding to its vertical reach by the suction tube mechanism demonstrated by simulations of tornadoes.

Figure 3:
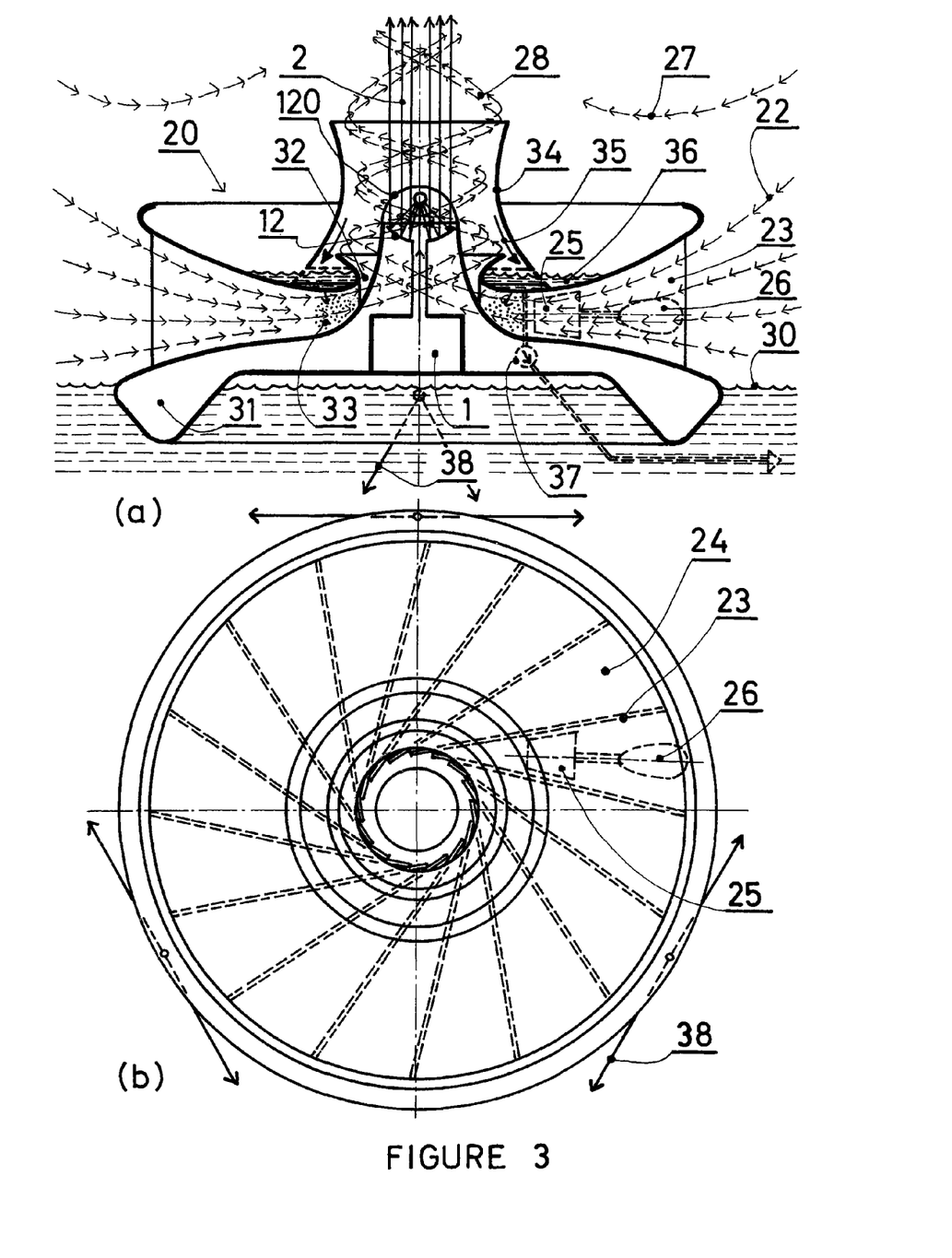
FIG. 3 illustrates a power plant based on a floating platform, with a condensation and a cyclone stage to produce clean water by reducing humidity of the passing air.

FIG. 3 shows a vertical cross-section of the power plant, 20, based on a circular floating platform 31, partially submerged below the water level 30. This is a schematic representation—a true planar cross-section would show the vanes 23 partially cut, which for reasons of clarity was not done here. Since the air 22 entering the plant is high in moisture content, means are provided to allow water condensation and separation before the air flow leaves through the top of the plant in the vortex 28. After passing through the turbines 25 the air flows through a constriction 32 gaining in speed and lowering the pressure. Injection of water mist 33 into the air flow at its passage through the constriction serves to nucleate condensation before the flow enters the tower section 34, which functions as a cyclone. Condensed water is separated from the air, thrown against the wall of the section 34, from where it runs down the wall as shown by arrow 35 and collects in the pool 36. Some of this water is used to nucleate the condensation; most of it is pumped to the land with a pump 37. The platform is secured in position and against the torque generated by the air flow by a number of anchor lines 38.

Power plants such as the one shown on FIG. 3 could additionally be outfitted by means of carbon dioxide removal from the air passing through the plant. No details are shown, but some of the known chemical means could readily be incorporated into the nucleation/condensation process in the constriction flow, followed by cyclone separation.

Detailed simulations of the airflow within the convection cell will have to be performed to estimate machine size at the target GW power levels. The height of the structure above the water level will probably need to be on the order of 150 m; the diameter of the platform up to 500 m, i.e. about 2.5% of the convective cell diameter. The area covered by the platform would constitute only about 0.06% of the area of the cell. Even though the efficiency of solar power collection proposed herein is certainly very low, the fact that the area of insolation is 1600 times larger than the plant itself points to the main difference to all state of the art solar systems, which typically require full coverage of the area of power collection. While impressive, these dimensions are within the range of similar power generation and transportation related structures being built today, e.g. cooling towers of power plants, ship hulls, nuclear plant containment structures, oil drilling platforms and container terminals (Iijima Kauhiro, Kim Yasunobu, Yao Tetsuya, A Structural Feasibity Study on a Concrete Large Floating Structure, Kaiyo Kogaku Shinpojiumu, Vol. 19; pg. Rombunno. 16, 2006).

If multiple turbines of more conventional architecture with horizontal axes are used, e.g. 16 units, the diameter of the turbine would be on the order of 30 to 40 m, probably with multiple stages. High strength composites are required to allow for high rotation speeds. Simulations done on shrouded turbine designs suggest that the shroud—in this case the air intake defined by the base, the roof and the vanes of the platform structure—should leave a gap around the turbine in order to realize the potential of the area increase provided by the shroud (M. Ganis, CFD Analysis of the Characteristics of a Shrouded Turbine, Thesis, U. of Udine, 2003, www.d-iplom.de).

Figure 4:
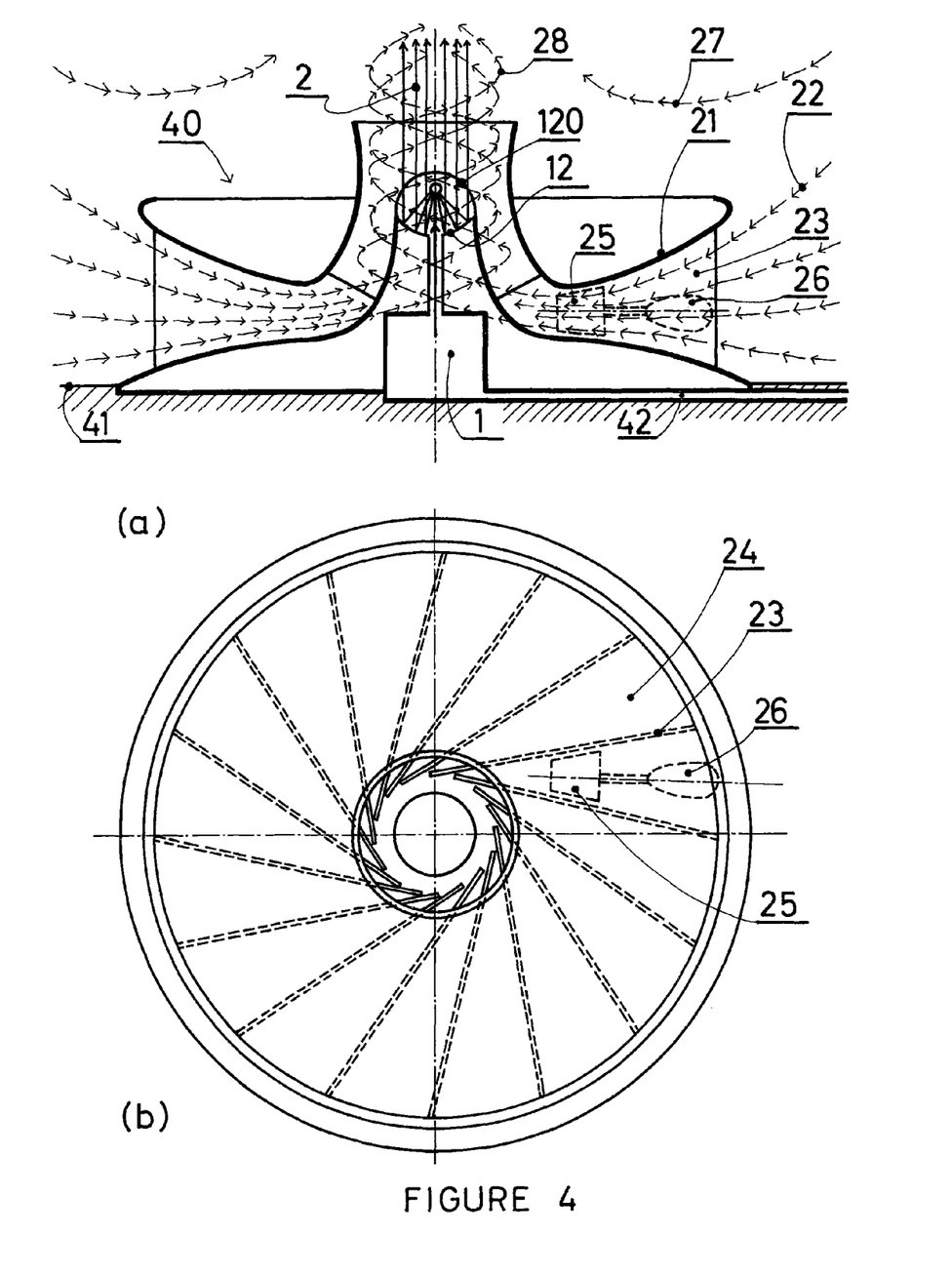
FIG. 4 illustrates a land-based power plant according to an embodiment of the invention.

FIG. 4 shows a land-based power station according to an embodiment of the invention. The superstructure 40 is identical to that shown on FIG. 2 for an ocean-based plant, but is built directly on the ground 41. An access tunnel 42 allows servicing of the microwave source 1. The top surface of the roof 21 is painted, as can be done for the ocean-based plants, to absorb heat which then supports the updraft by heating the air passing through the plant or just the air above the plant. With a daylight insolation on the order of 500 $W/m_2$, the total power collected by the roof of 500 m in diameter is approximately 100 MW.

Figure 5:
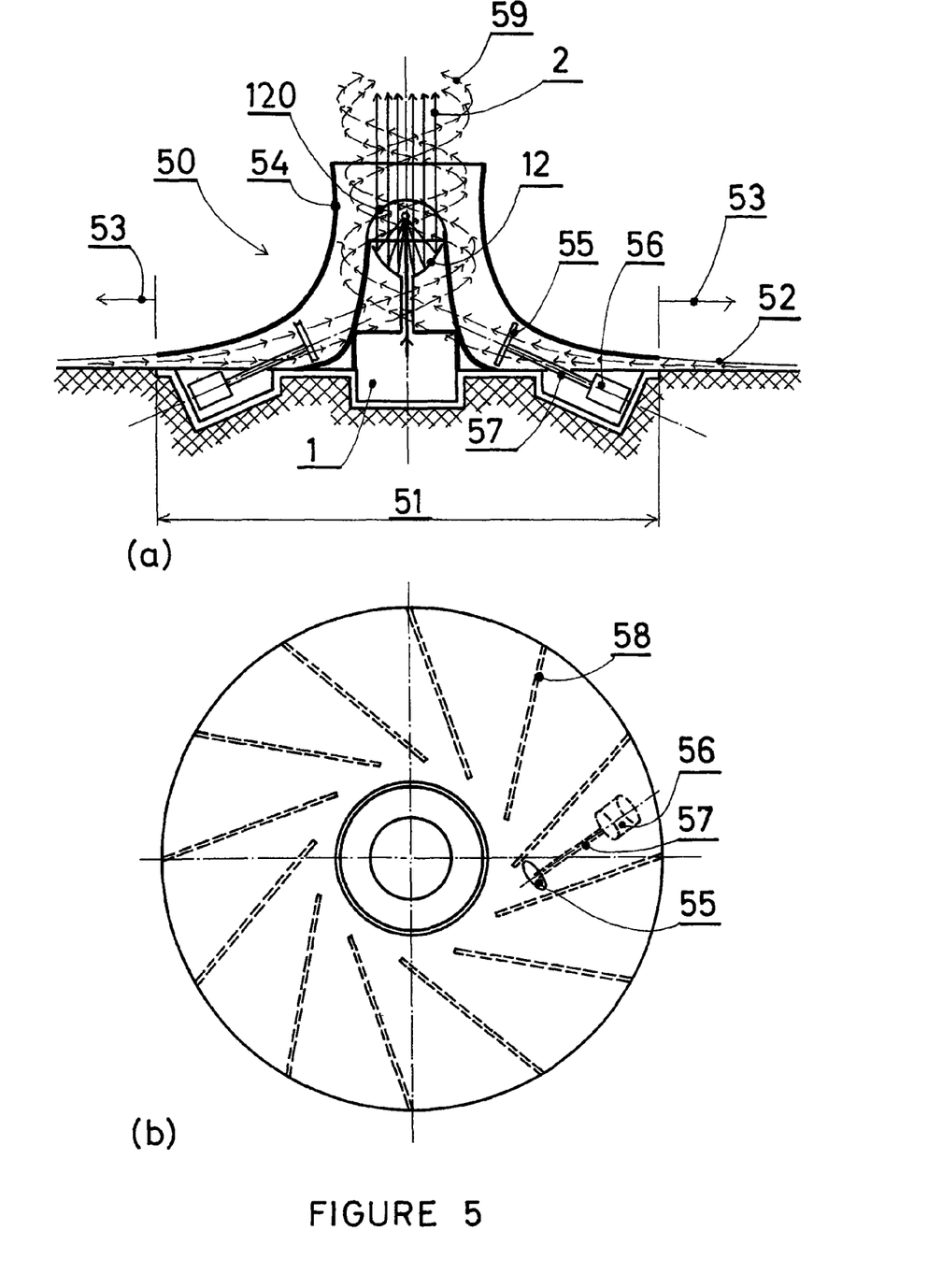
FIG. 5 illustrates a land-based power plant with a solar collector.

FIG. 5 shows a solar power station 50 combining the known principle of a green house roof proposed in conjunction with the solar chimney (Schlaich J, Bergermann R, Schiel W, Weinrebe G, Design of Commercial Solar Updraft Tower Systems—Utilization of Solar Induced Convective Flows for Power Generation, J. of Solar Energy Engineering, 127 (1), (2005): 117-124), but the chimney is replaced, or extended in height by a microwave beam. The central structure extends out to a diameter 51; the green house roof 52 covers a much larger area 53, several kilometers in diameter. The microwave beam source 1 is again shown in the center of the plant, with the antenna 12 radiating the beam 2 upwards through the center of the tower 54. The antenna 12 is covered by a dome 120. The turbines 55 and the generators 56, connected by shafts 57, may be slightly inclined to keep the airflow well streamlined along the ground. If built in southern Australia, below the equator, the vanes 58 should guide the airflow clockwise to reinforce the Coriolis effect and add to the angular momentum of the exiting air flow 59.

Figure 6:
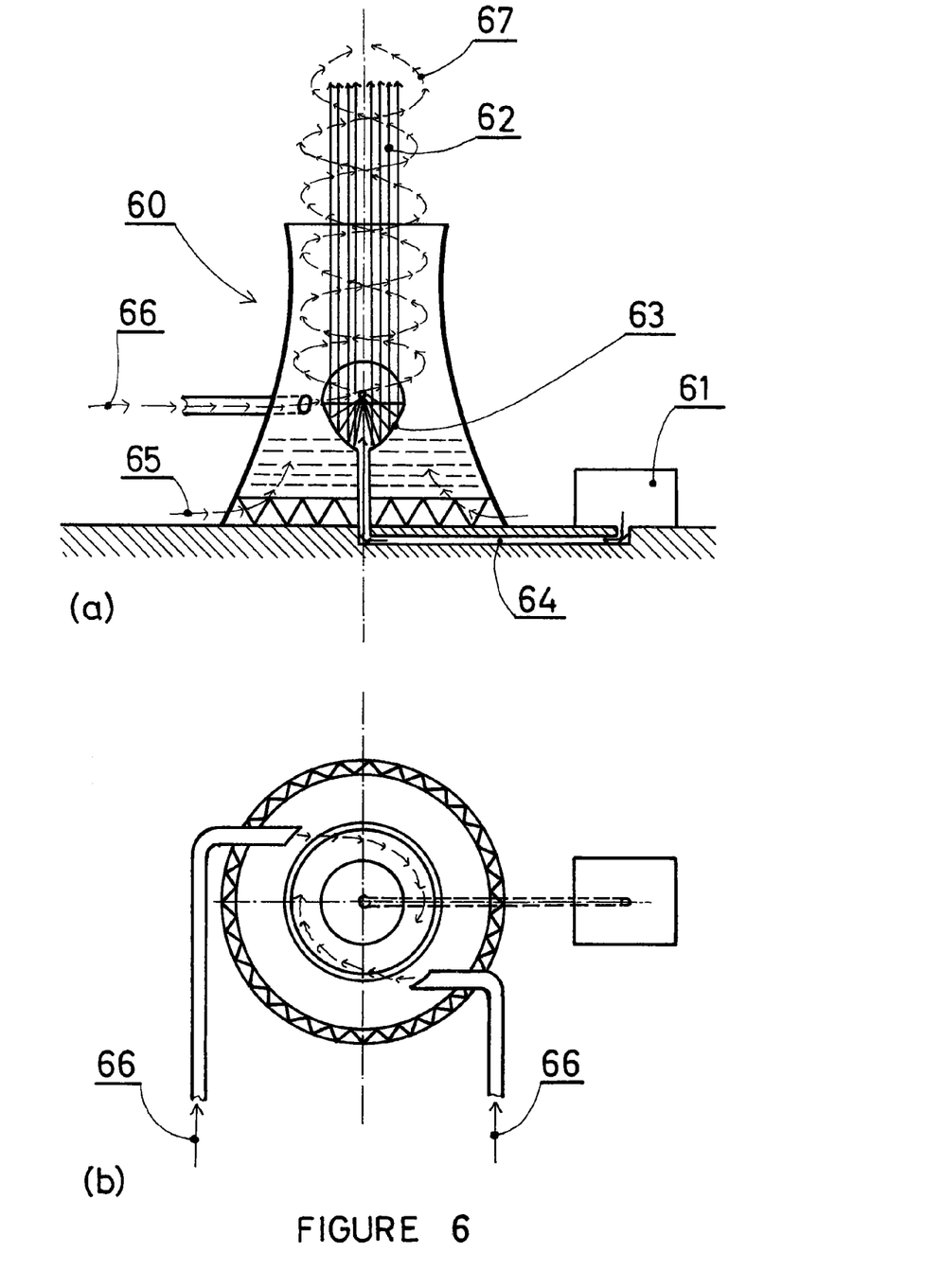
FIG. 6 illustrates a combined cooling tower/flue stack supplemented by a microwave beam to increase its efficiency.

FIG. 6 shows a combined cooling tower/chimney as sometimes built at coal fired power plants. Adding a high-power microwave beam 62, generated by the source 61, which powers the antenna 63 through a waveguide 64, can substantially increase the efficiency of the tower within its physical limitations. Both, the cooling air flow 65 and the flue gasses flow 66 through the tower are greatly increased, leaving it at the top in a vortex 67.

Figure 7:
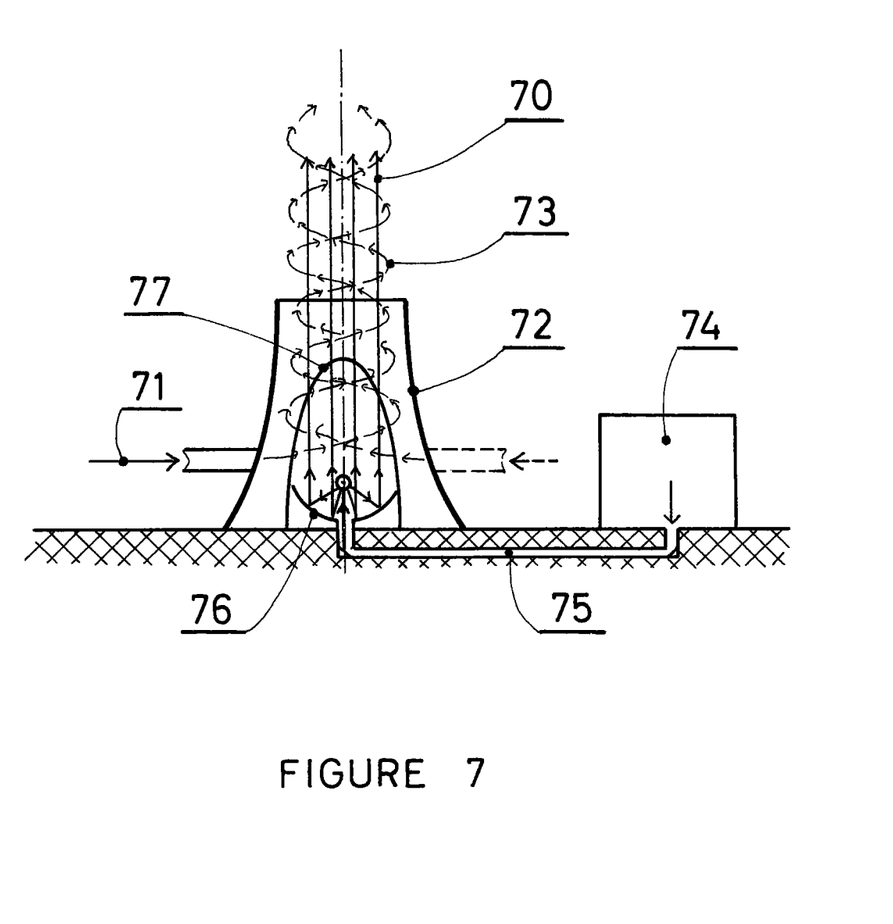
FIG. 7 illustrates a microwave-driven flue tower.

FIG. 7 shows an industrial chimney wherein the high physical structure of the chimney is replaced by the dynamic one using the microwave beam 70 to guide the hot air 71 entering the chimney 72, preferably via at least two tangential ports, through the overlying atmosphere in a vortex 73. Microwave generator 74 drives the antenna 76 through a waveguide 75. The antenna is protected by a dome 77. The complete structure could be as low as 50 m, yet it could effectively reach to thousands of meters above ground— much above the highest conventional chimneys built—the record of 420 m is held by GRES-2 power station in Kazakhstan.

Use of the microwave beam to guide the warmer, low altitude air through the atmosphere is the main innovative concept of the invention. It must be emphasized that the power expended by the beam is not used to lift the air per se, but rather to provide a "hole" in the atmosphere through which the surface air heated by insolation can escape to higher altitudes. A useful comparison is drilling holes in the bottom of a dish to allow water to run out of the dish—energy needed to drill the holes is not in direct connection to the work which can be extracted from the water running our under gravity. Yet without the holes one cannot extract the work. As for any potential environmental damage—60 GHz microwave beam intensity is very low, the beam power is spread over a very large surface area of the antenna dish (diameter on the order of 50 m for the large power plants) and therefore cannot cause any change at the molecular scale. Absorption by any other atmospheric component, including water, is negligible. Regarding potential problems with communications—exactly because of the high absorption by oxygen, this band is not useful for long-distance communications and, in fact, is unregulated. Lately, not least because it is unregulated, it is being used for very short distance, indoor communications.

Figure 8:
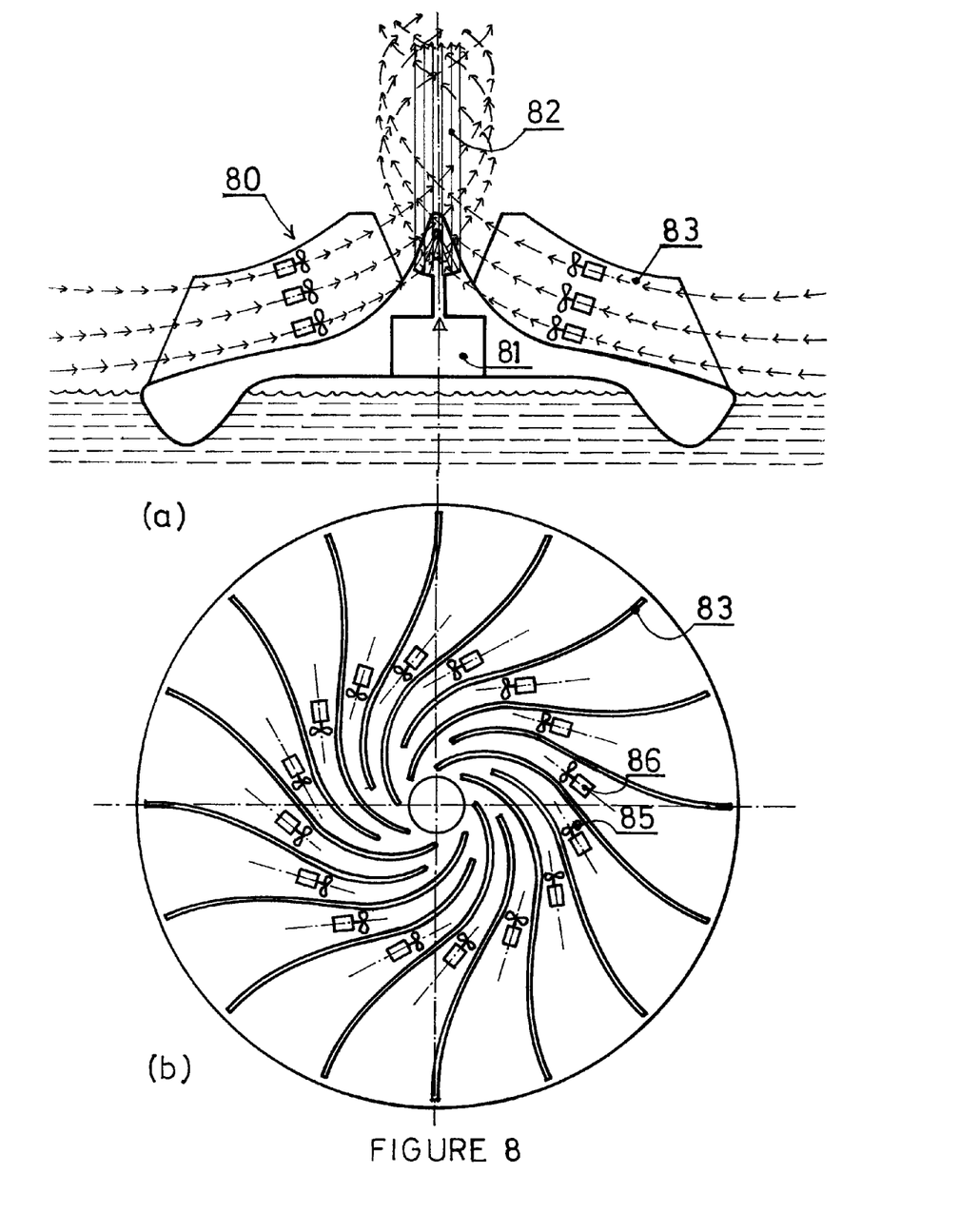
FIG. 8 is a schematic representation of a power plant on a floating platform without a roof construction.

FIG. 8a shows a vertical cross section of a power plant 80 on a floating platform with only the vertical vanes 83 and without any roof construction. While this may capture the convective cell air flow less efficiently, it is much easier to build. The microwave source 81, comprising a bank of gyrotrons, sends the beam 82 upwards above the plant.

FIG. 8b shows a top view of the plant with the vanes 83 guiding the air towards the center generating a vortex. Generators 86 are suspended from the vanes 83 and are powered by high speed turbines 85, basically reversed helicopter rotors. In each of the air ducts between the vanes 83 several turbine-generator sets can be suspended for optimal power capture. For example, as shown, 3 sets in 16 ducts formed by 16 vanes, would lead to 48 turbine-generator sets. Each one can be of approx 30 MW, with the high speed rotor of about 35 m in diameter. The platform is about 600 m in diameter.

Similar construction can be used for a land-based plant.

Having disclosed at least one embodiment of the present invention, various adaptations, modifications, additions, and improvements will be readily apparent to those of ordinary skill in the art. Such adaptations, modifications, additions and improvements are considered part of the invention which is only limited by the several claims attached hereto.

The invention claimed is:

1. A system for generating electricity comprising:
 a source of a high power microwave beam, wherein the beam is positioned vertically to create a convective cell comprising an atmospheric air updraft; and
 at least one generator positioned within an airflow created by the atmospheric air updraft to generate electricity.

2. The system of claim 1, wherein the high power microwave beam has a frequency centered within an absorption band of molecular oxygen.

3. The system of claim 1, wherein the high power microwave beam has a frequency centered at approximately 60 GHz.

4. The system of claim 1, further comprising:
 an atmospheric convective cell powered by solar heat anchored by the high power microwave beam.

5. The system of claim 4, wherein the atmospheric convective cell is positioned over a floating power plant, and wherein the generator is positioned to receive kinetic power from the convective cell.

6. The system of claim 5, further comprising:
 means for condensing moisture out of the air flowing through the plant to produce clean water.

7. The system of claim 5, further comprising:
 means for removing carbon dioxide from the air flowing through the plant.

8. The system of claim 4, wherein the atmospheric convective cell is positioned over a land-based power plant and wherein the generator is positioned to receive kinetic power from the convective cell.

9. The system of claim 1, further comprising a plurality of input vanes positioned around the high power microwave beam to create a vortex in the atmospheric air updraft.

10. The system of claim 1, further comprising at least one gyrotron positioned to create the high power microwave beam.

11. The system of claim 10, further comprising a plurality of gyrotrons.

12. The system of claim 1, wherein the high power microwave beam is positioned to supplement updraft over a cooling tower.

13. A system to create an atmospheric updraft comprising a source of a high power microwave beam, wherein the beam is positioned vertically to create a convective cell comprising an atmospheric air updraft.

14. The system of claim 13, wherein the high power microwave beam is positioned to supplement updraft over a land-based solar power plant, and wherein the solar power plant includes a green house roof to facilitate solar heat entrapment.

15. The system of claim 13, wherein the high power microwave beam is positioned to supplement updraft over a chimney.

\* \* \* \* \*